UNITED STATES PATENT OFFICE.

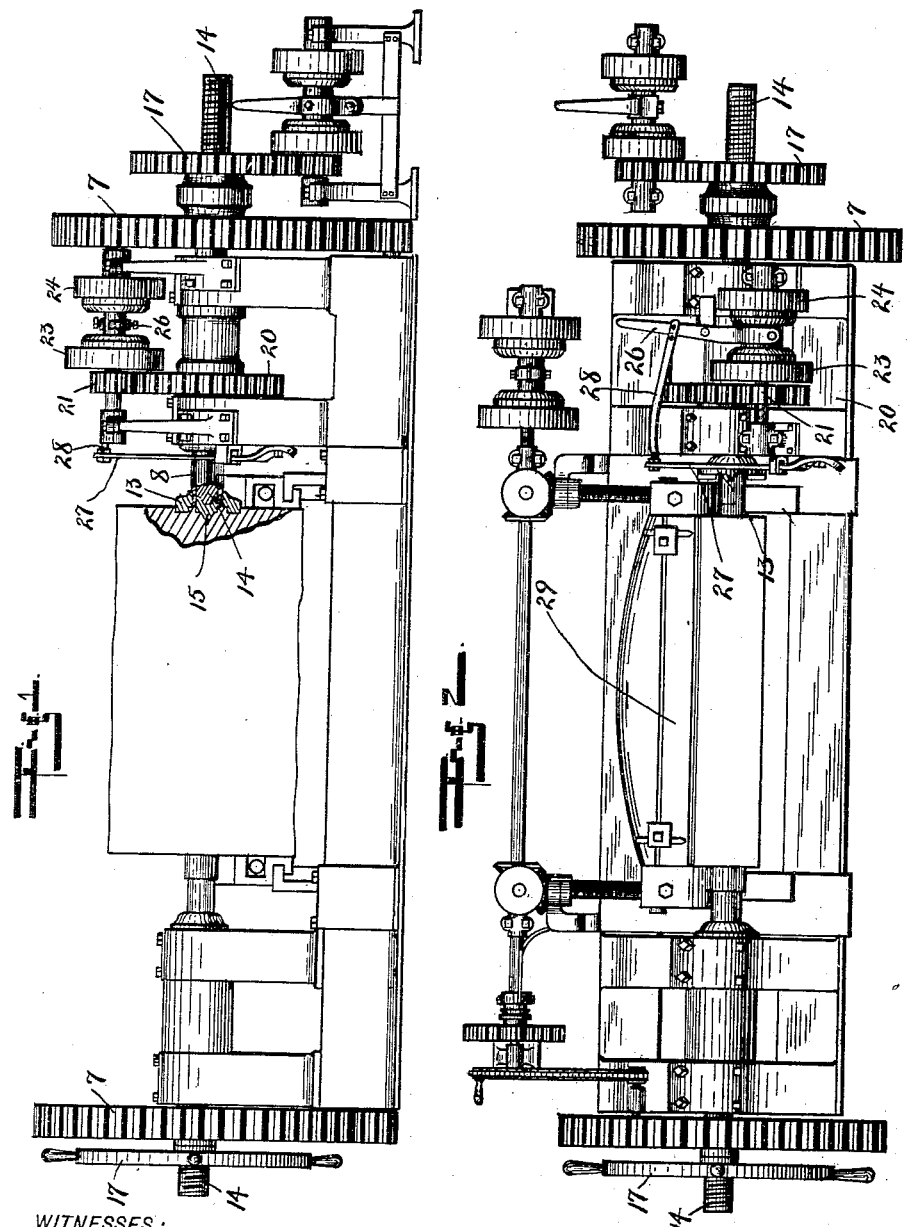

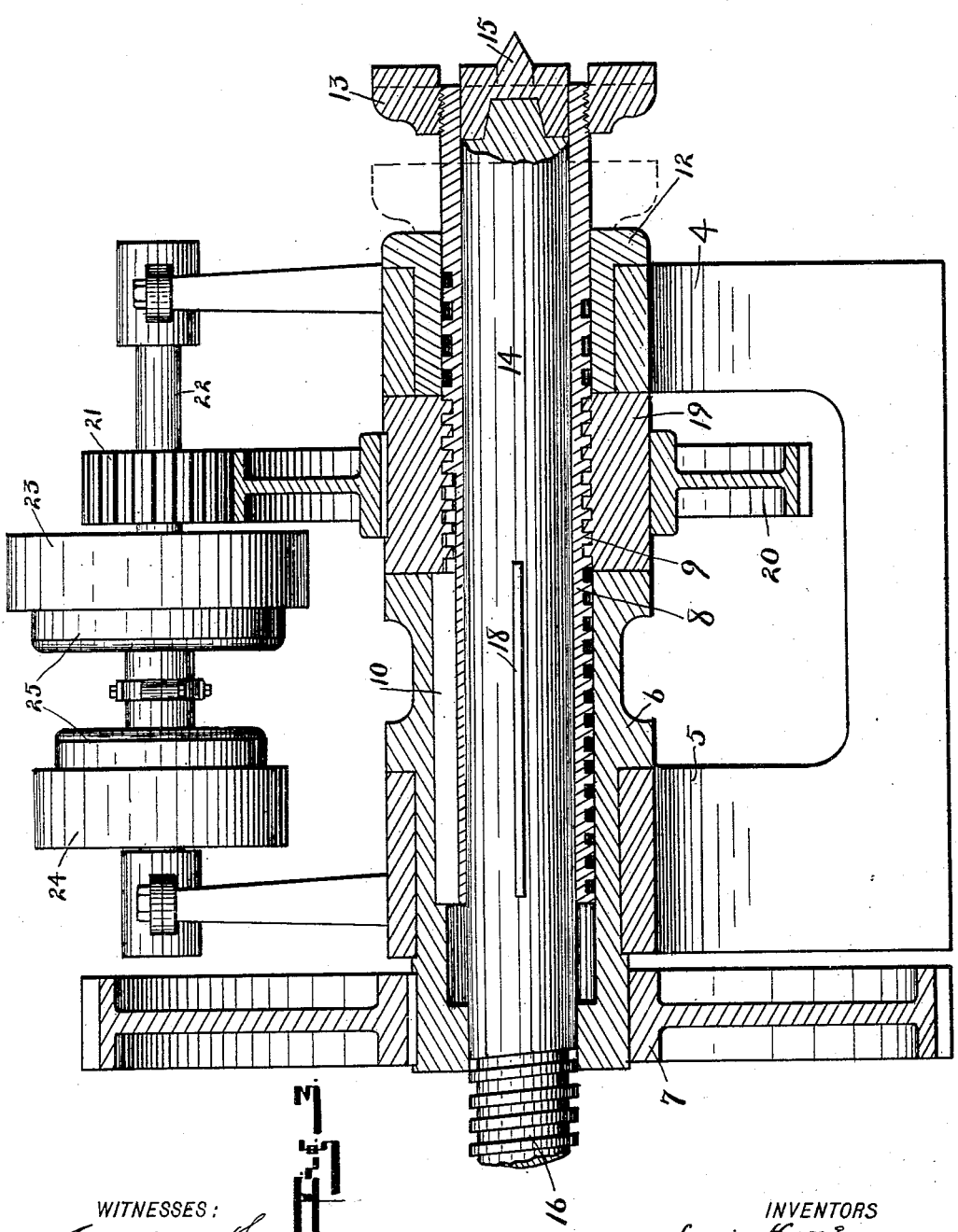

ISAAC SPRINGER AND LOUIS KOSS, OF INDIANAPOLIS, INDIANA.

DRIVING-CHUCK.

SPECIFICATION forming part of Letters Patent No. 664,905, dated January 1, 1901.

Application filed December 1, 1899. Serial No. 738,864. (No model.)

*To all whom it may concern:*

Be it known that we, ISAAC SPRINGER and LOUIS KOSS, citizens of the United States, residing at Indianapolis, in the county of Marion and State of Indiana, have invented a new and useful Driving-Chuck, of which the following is a specification.

Our invention relates to an improvement in driving-chucks for woodworking-lathes, more particularly veneer-machines.

In the manufacture of shaved veneer the log is turned against the knife by the means of chucks which engage the two ends. When the log is large, it is advisable to use a chuck whose diameter is considerably greater than the smallest diameter to which the log is to be worked, because it is practically difficult to turn large logs with a small chuck. It has heretofore been the practice, therefore, in veneer-machines of this class to chuck a new log with a large chuck, work the log down close to the chuck, and then remove the log from the machine and insert a smaller chuck, such practice resulting in a considerable loss of time.

The object of our present invention is to produce a chuck of such form that its effective size may be changed without removing the log from the machine.

The accompanying drawings illustrate our invention.

Figure 1 is a side elevation of a veneer-machine provided with our improved driving-chuck, the said chuck and the adjacent portion of the log being shown in section. Fig. 2 is a plan view thereof with the log reduced in diameter and the larger chuck withdrawn. Fig. 3 is a sectional view, on a larger scale, of a driving-chuck and adjacent parts.

In the drawings, 4 and 5 indicate a pair of standards forming a portion of the head or tail stock of a veneer-machine. Rotatably mounted in standard 5 is a sleeve 6, to the outer end of which is secured a suitable driving-gear 7. Axially movable in or on sleeve 6 is a tubular shaft 8, the outer periphery of which is provided with a series of threads 9. Shaft 8 is axially movable within sleeve 6, but is keyed so as to rotate with said sleeve by means of a suitable key 10. Shaft 8 extends through and revolves within a bearing 12, carried by standard 4, and to the projecting end of said tubular shaft is secured an annular chuck 13. Mounted within shaft 8 is a spindle 14, and secured to that end of said spindle adjacent chuck 13 is a chuck 15. The opposite end of spindle 14 is provided with threads 16, upon which is mounted the usual adjusting-nut 17, which nut may be power-driven, as shown at the right in Figs. 1 and 2, or hand-driven, as shown at the left in said figures. Spindle 14 is axially movable within and with relation to shaft 8, but is keyed thereto, so as to revolve therewith, by means of a suitable key 18. Mounted between the inner end of sleeve 6 and bearing 12 is a nut 19, which is threaded internally to engage the threads 9 of tubular shaft 8.

Any suitable means may be used to turn nut 19, and the same may be turned by hand, if desired. We prefer, however, to provide power-driven means for advancing nut 19, so as to force chuck 13 into engagement with the log, and for reversing said nut, so as to withdraw said chuck. For this purpose we secure to nut 19 a gear 20, which meshes with a gear 21, keyed to a shaft 22. Mounted upon the shaft 22 are advancing and reversing pulleys 23 and 24, respectively, either one of which may be clutched to shaft 22 by suitable clutches 25, which clutches may be thrown into engagement with said pulleys by means of a hand-lever 26. Pivoted upon the frame in position to have its free end engaged by the back of chuck 13 when it has been sufficiently withdrawn is an arm 27, which arm is connected by a link 28 to lever 26.

The operation is as follows: When a large log is to be placed in the machine, it is properly centered and then clamped between the two opposing chucks 15, which may be advanced and sunk into the wood, by means of nut 17. Nut 19 is then turned so as to advance tubular shaft 8 axially upon spindle 14, so as to force the annular chuck 13 into engagement with the log. The driving-gear 7 is then driven, and the revolution of this gear by means of sleeve 6, key 10, shaft 8, key 18, and spindle 14 revolves the two chucks 15 and 13 simultaneously. When the log has been brought down by knife 29 close to the outside of the annular chuck 13, the operator without stopping the production of veneer withdraws the chuck 13 from engagement with the log and beyond the end of the knife by reversing nut 19. If the machine is equipped with the power-driven means described, this withdrawal is accomplished by throwing lever 26 so as to bring clutch 25 into engagement with pulley 24. As the annular chuck 13 nears the limit of its withdrawal it strikes arm 27 and through said arm and link 28 throws lever 26 so as to withdraw the clutch, and thus stop nut 19.

It will be readily understood that the use of a chuck of this kind is not limited to veneer-machines and that, if desired, a similar chuck may be mounted at both ends of the log.

We claim as our invention—

1. A driving-chuck consisting of a central spindle, a chuck carried thereby, a tubular shaft axially movable upon and rotatable with said spindle, a chuck carried by said shaft, a series of threads formed upon said tubular shaft, a nut engaging said threads, means for independently rotating said nut whereby said shaft with its chuck may be moved axially upon said spindle, and means for rotating said nut, spindle and shaft.

2. In a driving-chuck, a central chuck-carrying spindle, a tubular externally-threaded chuck-carrying shaft axially movable upon but rotatable with said spindle, a driving-sleeve keyed to said spindle so as to permit axial movement thereof, means for axially moving the central spindle, an axially-fixed rotating nut mounted upon the threaded portion of said tubular shaft, means whereby said nut may be independently rotated, and means for rotating together said nut, spindle and shaft.

3. In a driving-chuck, a central chuck-carrying spindle, a tubular, axially-threaded, chuck-carrying shaft axially movable upon but rotatable with said spindle, a nut arranged to engage the threads of said shaft, suitable gearing for driving said nut, and means operated by the axial movement of said shaft for throwing said gearing out of action.

ISAAC SPRINGER.
LOUIS KOSS.

Witnesses:
ARTHUR M. HOOD,
FRANK A. FABLE.